July 16, 1935.  E. D. DICKINSON  2,008,543
SHAFT BEARING FOR ELASTIC FLUID ENGINES
Filed Feb. 3, 1934
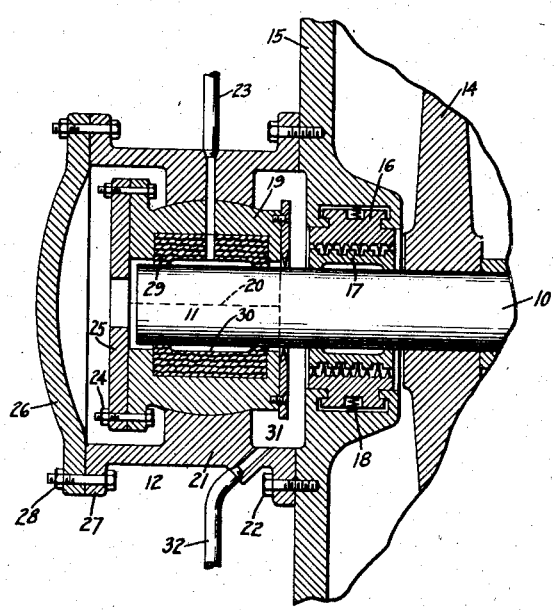
Inventor:
Edgar D. Dickinson,
by Harry E. Dunham
His Attorney.

Patented July 16, 1935

2,008,543

UNITED STATES PATENT OFFICE 2,008,543

SHAFT BEARING FOR ELASTIC FLUID ENGINES

Edgar D. Dickinson, Beverly, Mass., assignor to General Electric Company, a corporation of New York Application February 3, 1934, Serial No. 709,634

3 Claims. (Cl. 308—134)

The present invention relates to shaft bearings and more particularly to the kind of bearings for which water is used as lubricant. This kind of bearing is advantageous in all cases where the lubricant, that is the water, may come in contact with steam as is the case with bearings for elastic fluid turbines or engines.

The object of the invention is to provide an improved construction and arrangement for a bearing of the kind specified in combination with elastic fluid turbines.

According to my invention the lubricant for the bearing, that is the water, which also serves as a cooling medium for the bearing and the shaft, is used for condensing and carrying away the steam leaking along the shaft of an elastic fluid turbine or engine. Both leakage steam of the turbine and water discharged from the bearing are conducted to a chamber or container in which they are mixed to condense the leakage steam.

Other features of my invention will be more fully understood from a consideration of the following description and the claims appended thereto in connection with the accompanying drawing which forms a part of my specification.

In the drawing I have shown by way of example a bearing together with a portion of an elastic fluid turbine in accordance with my invention.

The rotary shaft 10 comprises a journal portion 11 supported by a shaft bearing 12. The shaft 10 carries a bucket wheel 14 of an elastic fluid turbine. The turbine has an outer casing 15 holding a portion 16 of a packing for preventing elastic fluid from leaking along the shaft. Another portion 17 of the packing is fastened to the shaft. The portion 16, as shown in the drawing, is secured by a dovetail connection to the casing 15 and is yieldably forced towards the other portion 17 by the provision of springs 18. Such packing may be provided for the high pressure end, as well as the low pressure end of the turbine.

The shaft bearing comprises a pillow block 19 having an upper and a lower portion split along a horizontal plane through the center of the shaft as indicated at 20. The block 19 is supported by a pedestal 21 having a flanged portion secured to the outer casing 15 by means of bolts 22. A pipe 23 registering with openings in the pillow block and the pedestal is provided for conducting lubricant to the bearing. Fastened to the left-hand end of the pillow block by means of bolts 24 is a plate 25. The left-hand end of pedestal 21 is closed by a cover plate 26 fastened to a flanged portion 27 of the pedestal by means of bolts 28. The bearing so far described may be considered typical of any kind of shaft bearings.

In order to obtain satisfactory lubrication I provide the bearing according to my invention with a special lining which may be made of fibrous material united by an artificial resin, or of bronze impregnated by graphite, and use water for lubricating the bearing. In the present example I have shown the bearing as being provided with a lining 29 held in a recessed portion of the pillow block and made at least partly of a phenolic condensation product. The water is supplied through the conduit 23 and conducted along and around the journal through grooves 30 in the bearing lining. In a preferred embodiment of my invention I supply water at a pressure of the order of the pressure in the high pressure end of the turbine as in this case the water acts as a sealing means to minimize leakage of steam.

As pointed out above, the pedestal 21 of the bearing has a flanged portion which is fastened to the casing. This portion together with the casing define a chamber or container 31 for receiving lubricating water discharged from the bearing and steam leaking past the packing of the turbine. Water and steam mix in the chamber 31 whereby the steam condenses. A conduit 32 is connected to the chamber 31 for draining the mixture of lubricating water and condensate therefrom. This mixture may be discharged to any suitable point such as the turbine condenser, not shown. In the present instance I have shown my improved bearing construction in connection with the high pressure end of the turbine. A similar construction may be used for the low pressure end in which case the arrangement has a further advantage in that it permits the omission of a special steam packing at the low pressure end between the turbine casing and the shaft.

With my invention I have accomplished an improved construction and arrangement of bearings in combination with elastic fluid engines. One advantage of the arrangement, as just pointed out, is that it permits the omission of a low special pressure packing. In addition the arrangement shortens the length of a turbine unit and at the same time reduces the weight thereof. Furthermore, with my invention the possibilities of loss of steam are considerably reduced. The use of water-lubricated bearings also reduces the amount of lubricating oil which has to be pumped and in case all bearings of an engine are provided with water lubrication the oil pumps may be entirely omitted.

What I claim as new and desire to secure by Letters Patent in the United States is:

1. In an elastic fluid engine, a casing, a shaft projecting through the casing, a bearing for supporting the shaft, the bearing including a pedestal having a flanged portion fastened to the turbine casing and defining a chamber therewith, and means for conducting water under pressure to the bearing for lubricating and cooling the same, the arrangement being such that an amount of lubricating water is discharged from the bearing into said chamber sufficient to condense all of the leakage steam flowing along the shaft into the chamber.

2. In an elastic fluid engine, a casing, a rotatable shaft projecting through the casing, a bearing for supporting the shaft, a packing between the shaft and the casing for minimizing leakage of elastic fluid along the shaft, means for conducting lubricating water to the bearing, and a container defined between the bearing and the casing for receiving an amount of water discharged from the bearing sufficient to condense the leakage fluid from the turbine.

3. In an elastic fluid engine, a casing, a rotatable shaft, a bearing for supporting the shaft, a packing between the shaft and the casing for minimizing leakage of elastic fluid along the shaft, the bearing including a lining permitting the use of water as lubricant, means for conducting lubricating water to the bearing, a chamber defined between the bearing and the casing for receiving leakage fluid from the engine and an amount of water from the bearing sufficient to condense the leakage fluid, and a discharge conduit connected to the chamber.

EDGAR D. DICKINSON.